United States Patent
Ting et al.

(10) Patent No.: US 9,063,567 B2
(45) Date of Patent: Jun. 23, 2015

(54) DISPLAY CONTROL APPARATUS AND DISPLAY CONTROL METHOD

(75) Inventors: Wen-Hung Ting, Guiren Township, Tainan County (TW); Chia-Chang Li, Pingtung (TW); Chieh-Fu Tsai, Kaohsiung (TW); Chien-Chun Kuo, Tainan (TW); Po-Lung Chen, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 382 days.

(21) Appl. No.: 13/337,675

(22) Filed: Dec. 27, 2011

(65) Prior Publication Data

US 2013/0088428 A1 Apr. 11, 2013

(30) Foreign Application Priority Data

Oct. 11, 2011 (TW) .............................. 100136827 A

(51) Int. Cl.
G06F 3/033 (2013.01)
G06F 3/01 (2006.01)
G06F 3/0484 (2013.01)

(52) U.S. Cl.
CPC ........ *G06F 3/012* (2013.01); *G09G 2320/0693* (2013.01); *G09G 2354/00* (2013.01); *G09G 2380/00* (2013.01); *G06F 3/04847* (2013.01)

(58) Field of Classification Search
None
See application file for complete search history.

(56) References Cited

U.S. PATENT DOCUMENTS

| 7,519,223 | B2 | 4/2009 | Dehlin et al. | |
| 7,646,394 | B1* | 1/2010 | Neely et al. | 345/633 |
| 2003/0235341 | A1* | 12/2003 | Gokturk et al. | 382/243 |
| 2008/0112592 | A1* | 5/2008 | Wu et al. | 382/103 |
| 2008/0205790 | A1 | 8/2008 | Wear et al. | |
| 2009/0183125 | A1 | 7/2009 | Magal et al. | |
| 2009/0228841 | A1 | 9/2009 | Hildreth | |
| 2009/0315740 | A1 | 12/2009 | Hildreth et al. | |
| 2010/0215257 | A1 | 8/2010 | Dariush et al. | |
| 2011/0057875 | A1 | 3/2011 | Shigeta et al. | |
| 2011/0107216 | A1 | 5/2011 | Bi | |

FOREIGN PATENT DOCUMENTS

CN 100405261 7/2008
TW 200508976 A 3/2005

(Continued)

OTHER PUBLICATIONS

English language translation of abstract of TW 200742856 (published Nov. 16, 2007).

(Continued)

*Primary Examiner* — Christopher R Lamb
(74) *Attorney, Agent, or Firm* — McClure, Qualey & Rodack, LLP

(57) ABSTRACT

A display control apparatus and a display control method are disclosed. The display control apparatus comprises a recognition circuit and a mapping circuit. The recognition circuit recognizes a head position and a control point position of an operator. The mapping circuit dynamically adjusts the operating boundary according to the head position, the control point position and a display boundary, and calculates the cursor position on a display according to the control point position, the operating boundary and the display boundary, wherein the cursor position remains on a imagine line passing through the head position and the control point position.

20 Claims, 8 Drawing Sheets

(56) References Cited

FOREIGN PATENT DOCUMENTS

TW    200742856    11/2007
TW    200834472    8/2008

OTHER PUBLICATIONS

English language translation of abstract of TW 200834472 (published Aug. 16, 2008).

TW Notice of Allowance dated Feb. 26, 2014.

Full English (machine) translation of CN100405261 (Published Jul. 23, 2008).

"Development and Application of a Multi-functional PC Camera with Eye-tracking and Head Controlled System", pub. date, May 28, 2003.

"Tracking the Parts of Human Body Systems base on Triangle Feature Matching", pub. date, Jun. 1, 2009.

* cited by examiner

DISPLAY CONTROL APPARATUS AND DISPLAY CONTROL METHOD

This application claims the benefit of Taiwan application Serial No. 100136827, filed Oct. 11, 2011, the disclosure of which is incorporated by reference herein in its entirety.

BACKGROUND

1. Technical Field

The disclosed embodiments relate in general to a display control apparatus and a display control method.

2. Description of the Related Art

The device for controlling the panel/remote controller of a home appliance and the operation control of an electronic product ranges from the mouse/keyboard of a computer and the touch panel of a mobile device, and the focus is always placed on convenience and function. In recent years, due to the advance in image detection type man-machine interface technology, contactless, hand gesture control interface is disclosed. No matter how technology evolves, the human-centered concept in product design still remains dominant. In other words, whether the hand gesture control interface possesses intuitive convenience is crucial to consumers' acceptance.

The current hand gesture operation control mainly has two types. The first type is hand trace pattern recognition method in which instructions are formatted from specific patterns formed by the movement trace of the hand such as waving, forward turning and reverse turning. In the second type, instructions are formatted by a quasi-cursor formed by hand position information. The second type is more intuitive in terms of operation control, and is superior to the first type in terms of variety or flexibility. Therefore, how to generate a mechanism corresponding to the cursor on a display in a more convenient and intuitive manner is crucial to product acceptance.

According to a conventional method, the cursor is generated by mapping the coordinates of an entire image onto a display. However, such method has the problem that the icon range corresponding to the display is too small. According to an alternate conventional, reference original points are set in an image for mapping the coordinates of the image to the display coordinates. However, the alternate conventional method makes the operator unable to control the range of operation.

SUMMARY

The disclosure is directed to a display control apparatus and a display control method.

According to one embodiment, a display control apparatus is disclosed. The display control apparatus comprises a recognition circuit and a mapping circuit. The recognition circuit recognizes a head position and a control point position of an operator. The mapping circuit dynamically adjusts the operating boundary according to the head position, the control point position and a display boundary, and calculates the cursor position on a display according to the control point position, the operating boundary and the display boundary, wherein the cursor position remains on a imagine line passing through the head position and the control point position.

According to another embodiment, a display control method is disclosed. The display control method comprises: recognizing a head position and a control point position of an operator; dynamically adjusting the operating boundary according to the head position, the control point position and a display boundary; and calculating the cursor position on a display according to the control point position, the operating boundary and the display boundary. The cursor position remains on a imagine line passing through the head position and the control point position.

Figure 1:
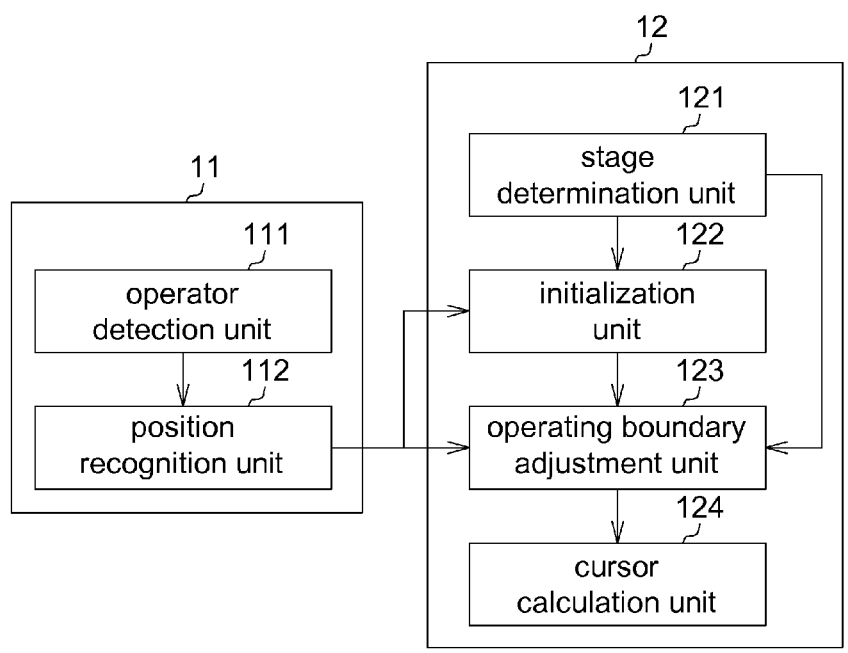
FIG. 1 shows a block diagram of a display control apparatus according to an embodiment.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
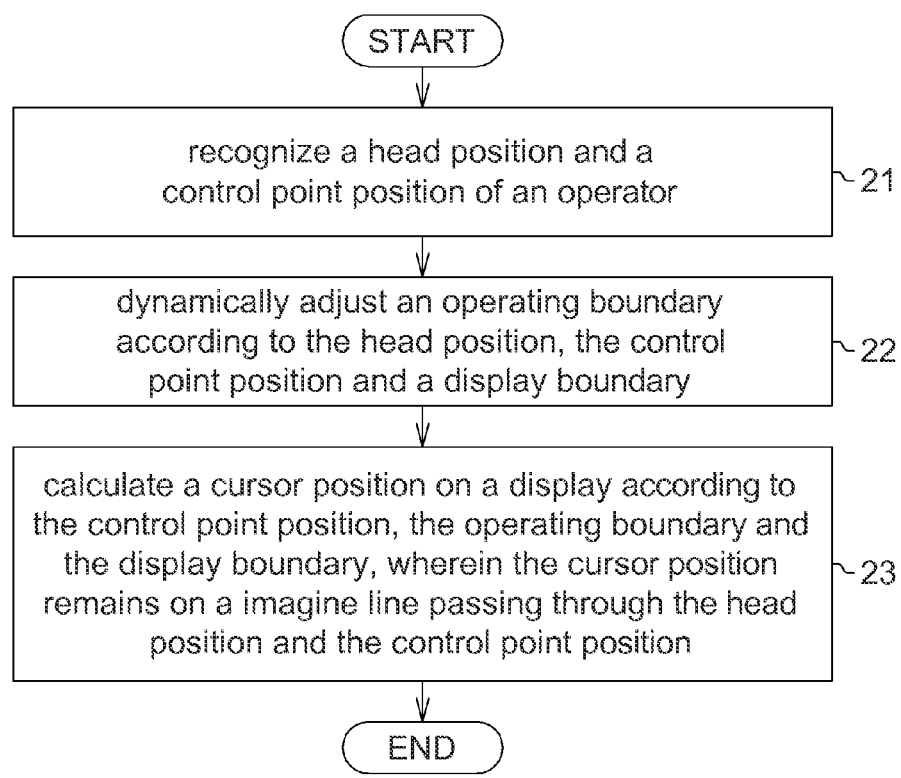
FIG. 2 shows a flowchart of a display control method according to an embodiment.
Figure 3:
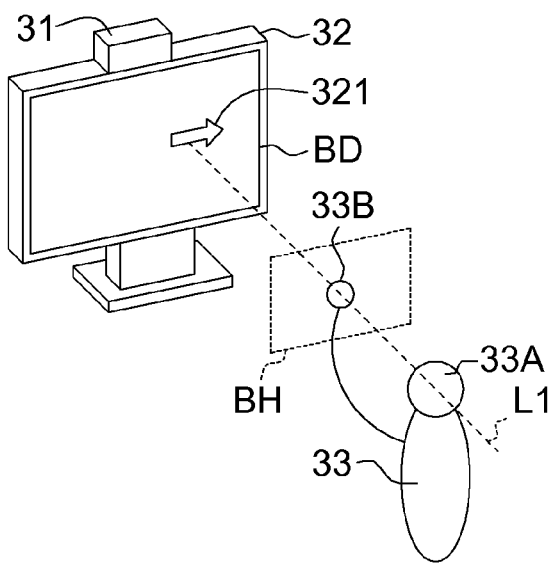
FIG. 3 shows a schematic diagram of an operator controlling a cursor.

Referring to FIG. 1, FIG. 2 and FIG. 3. FIG. 1 shows a block diagram of a display control apparatus according to an embodiment. FIG. 2 shows a flowchart of a display control method according to an embodiment. FIG. 3 shows a schematic diagram of an operator controlling a cursor. The display control apparatus 1 comprises a recognition circuit 11 and a mapping circuit 12. The mapping circuit 12 coupled with the recognition circuit 11, and the recognition circuit 11 and the mapping circuit 12 are realized by a processor. The display control method comprises steps 21~23. As indicated in step 21, the recognition circuit 11 receives an operator image captured by an image capturing apparatus 31 and recognizes a head position 33A and a control point position 33B of an operator 33. The control point position 33B is such as a palm position of the operator 33. As indicated in step 22, the mapping circuit 12 dynamically adjusts the operating boundary BH according to the head position 33A, the control point position 33B and a display boundary BD. As indicated in step 23, the mapping circuit 12 calculates the cursor position 321 on the display 32 according to the control point position 33B, the operating boundary BH and the display boundary BD, wherein the cursor position 321 remains on a imagine line passing through the head position 33A and the control point position 33B. The image capturing apparatus 31, realized by such as a dual-camera, is disposed above the display 32.

Figure 4:
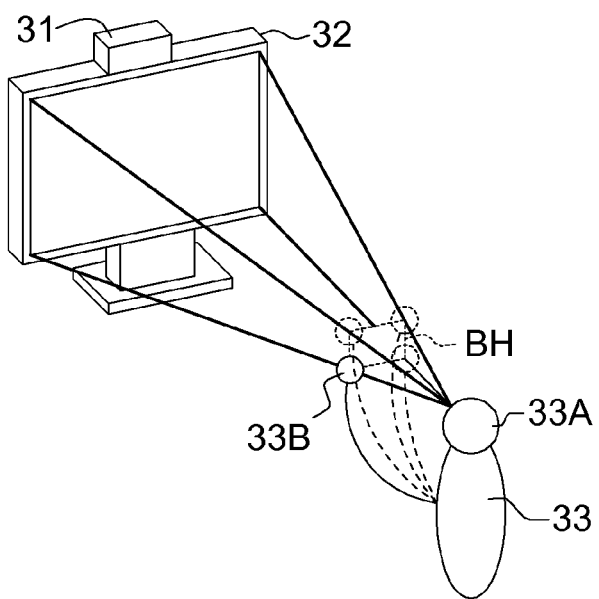
FIG. 4 shows a schematic diagram of an operator being farther from a display.
Figure 5:
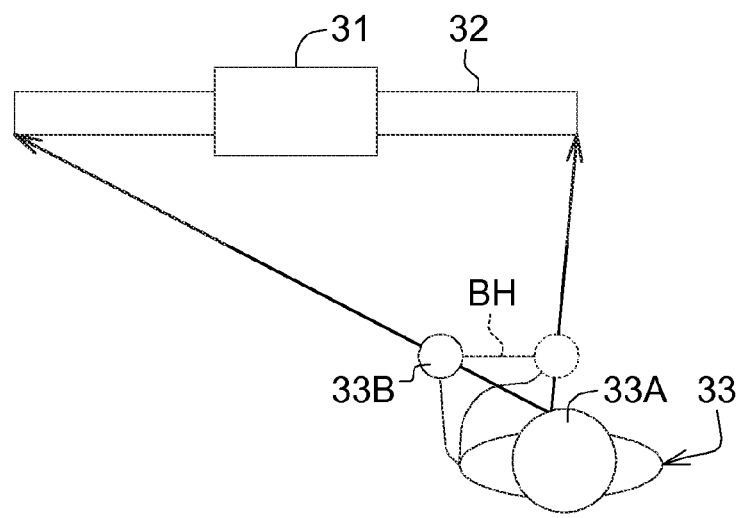
FIG. 5 shows a top view of FIG. 4.
Figure 6:
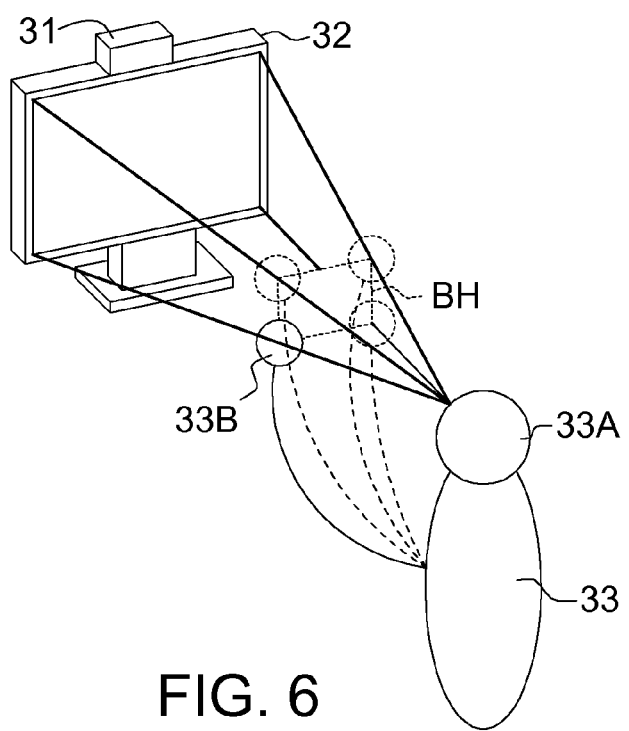
FIG. 6 shows a schematic diagram of an operator being closer to a display.
Figure 7:
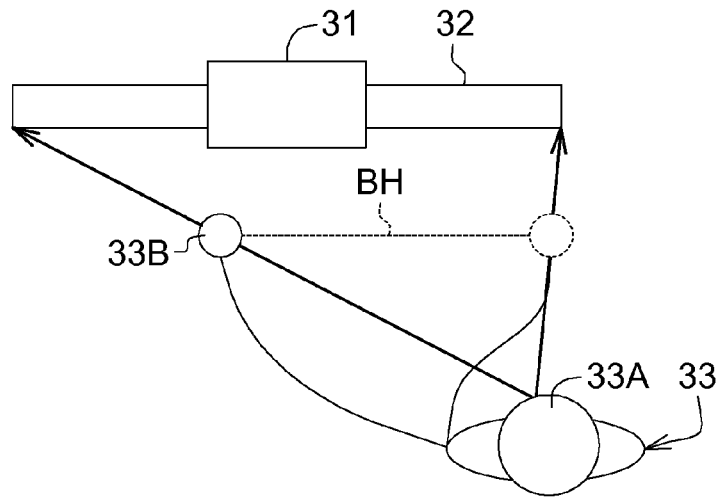
FIG. 7 shows a top view of FIG. 6.

Referring to FIG. 4, FIG. 5, FIG. 6 and FIG. 7. FIG. 4 shows a schematic diagram of an operator being farther from a display. FIG. 5 shows a top view of FIG. 4. FIG. 6 shows a schematic diagram of an operator being closer to a display. FIG. 7 shows a top view of FIG. 6. The operating boundary BH is dynamically adjusted according to the distance between the operator 33 and the display 32. For example, when the operator is farther away from the display 32 as indicated in FIG. 4 and FIG. 5, the size of the operating boundary BH is indicated in FIG. 4. To the contrary, when the operator 33 is closer to the display 32 as indicated in FIG. 6 and FIG. 7, the size of the operating boundary BH as indicated in FIG. 6. It is apparent from FIGS. 4~7 that when the operator 33 gets closer to the display 32, the operating boundary BH gradually swells, making the operation range of the operator 33 swells as well. To the contrary, when the operator 33 moves farther away from the display 32, the operating boundary BH gradually shrinks, making the operation range of the operator 33 shrinks as well. Since the operating boundary BH is dynamically adjusted according to the head position 33A, the control point position 33B and the display boundary BD, it is assured that the cursor position 321 remains on a imagine line L1 passing through the head position 33A and the control point position 33B. Thus, the operator can intuitively control the cursor, and the operation control is made more convenient.

Figure 8:
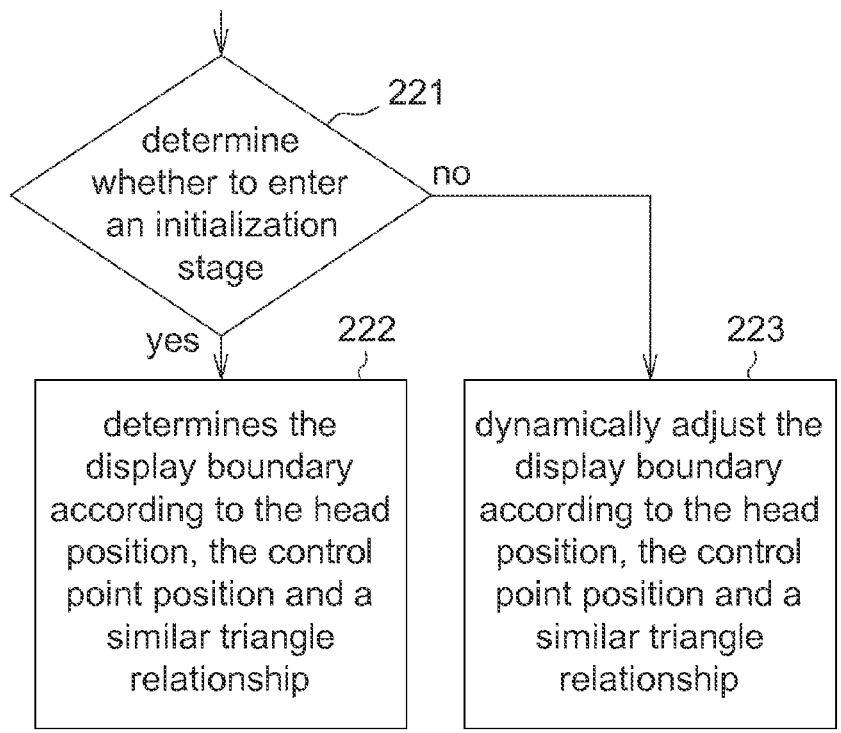
FIG. 8 shows a detailed flowchart of step 22.
Figure 9:
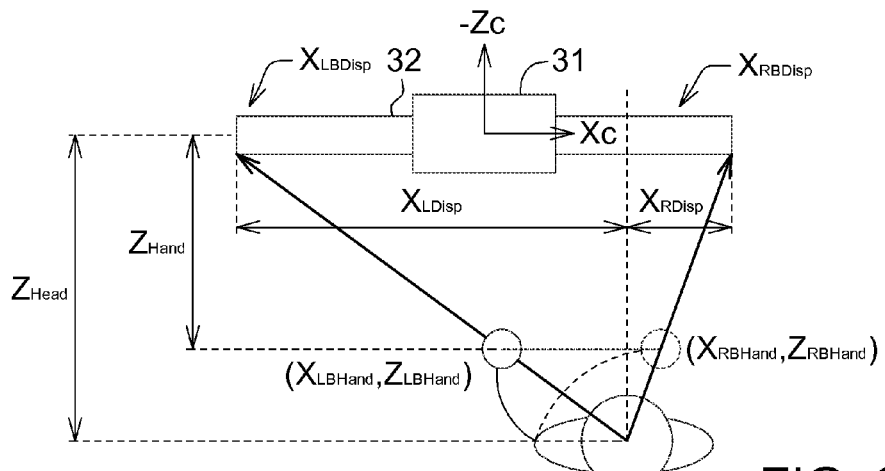
FIG. 9 shows a schematic diagram of determining a display boundary in an initialization stage.
Figure 10:
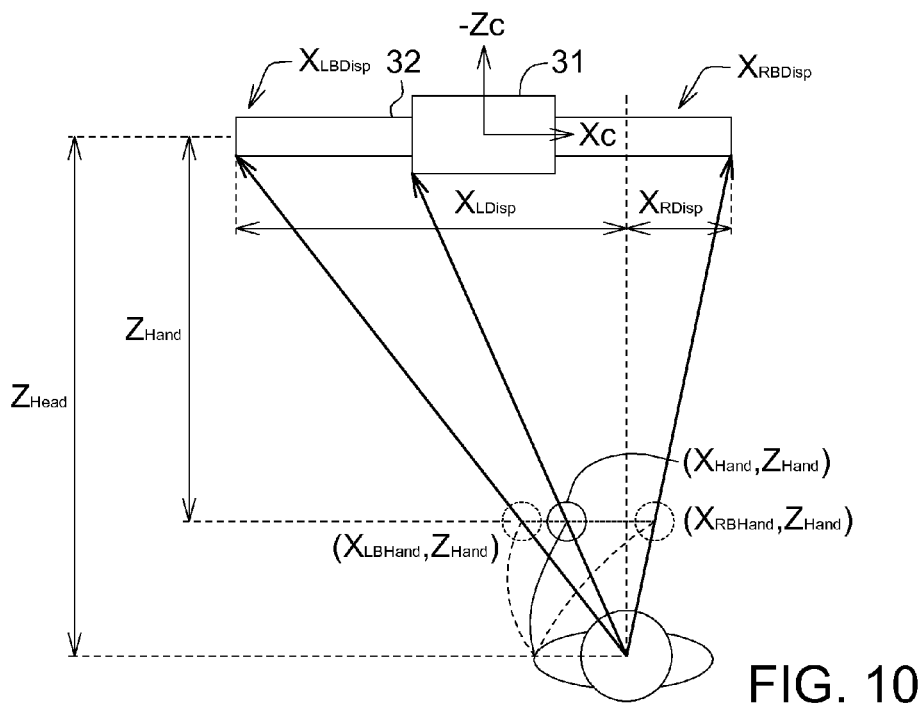
FIG. 10 shows a schematic diagram of determining a display boundary in a practical operating stage.

Referring to FIG. 1, FIG. 2, FIG. 8, FIG. 9 and FIG. 10. FIG. 8 shows a detailed flowchart of step 22. FIG. 9 shows a schematic diagram of determining a display boundary in an initialization stage. FIG. 10 shows a schematic diagram of determining a display boundary in a practical operating stage. The mapping circuit 12 comprises a stage determination unit 121, an initialization unit 122, an operating boundary adjustment unit 123 and a cursor calculation unit 124. Step 22 further comprises steps 221~223. As indicated in step 221, the stage determination unit 121 determines whether the display control apparatus 1 enters an initialization stage. Step 222 is executed if the display control apparatus 1 enters the initialization stage, and step 223 is executed if the display control apparatus 1 does not enter the initialization stage.

As indicated in step 222, the initialization unit 122 determines the display boundary BD according to the head position 33A, the control point position 33B and a similar triangle relationship, wherein the control point position 33B needs to remain on an imagine line L2 passing through the head position 33A and the display corner. Furthermore, since the setting of the operating boundary BH depends on the display boundary BD, the display control apparatus 1 must enter the initialization stage to execute calibration operation before entering a practical operating stage. In the initialization stage, the operator, at a fixed position, extends his/her operating palm to set four reference points, that is, the four corner points of the display 32. After the line of sight of the operator 33 passes through the operation point and then corresponds to the four corner points of the display 32, the initialization unit 122 determines the display boundary BD according to the head position 33A and the control point position 33B.

For example, as indicated in FIG. 9, after the line of sight of the operator 33 passes through the coordinates ($X_{LBHand}$, $Z_{LBHand}$) and ($X_{RBHand}$, $Z_{RBHand}$) of the operation point, the line of sight corresponds to two corner points of the display 32. The coordinates of the corner point of the display 32 are expressed as:

$$X_{LBDisp} = X_{Head} - \frac{(X_{Head} - X_{LBHand}) \cdot Z_{Head}}{Z_{Head} - Z_{Hand}} \text{ and}$$

-continued
$$X_{RBDisp} = X_{Head} + \frac{(X_{RBHand} - X_{Head}) \cdot Z_{Head}}{Z_{Head} - Z_{Hand}}.$$

Given that the head position and the control point position are already known, the coordinates $X_{LBDisp}$ and $X_{RBDisp}$ will be obtained accordingly. Likewise, the coordinates $Y_{LBDisp}$ and $Y_{RBDisp}$ of the corner points of the display 32 can also be obtained in a similar way, and the similarities are not repeated here.

If the display control apparatus 1 does not enter an initialization stage, implies that the display control apparatus 1 enters the practical operating stage. If the display control apparatus 1 enters a practical operating stage, implies that the operating boundary adjustment unit 123 dynamically adjusts the operating boundary BH according to the head position, the control point position, the display boundary BD and a similar triangle relationship. Furthermore, the head position and the control point position can be immediately obtained in the practical operating stage but the operation range is still unknown. Therefore, the current operating boundary BH can be obtained from the display boundary BD estimated in the initialization stage.

For example, the coordinates of the operating boundary BH as indicated in FIG. 10 are expressed as:

$$X_{LBHand} = X_{Head} - \frac{(X_{Head} - X_{LBDisp}) \cdot (Z_{Head} - Z_{Hand})}{Z_{Head}}$$

$$X_{RBHand} = X_{Head} + \frac{(X_{RBDisp} - X_{Head}) \cdot (Z_{Head} - Z_{Hand})}{Z_{Head}}.$$

Since the display boundary BD is already known, the coordinates $X_{LBHand}$ and $X_{RBHand}$ can be obtained accordingly. Likewise, the coordinates $Y_{LBHand}$ and $Y_{RBHand}$ of the operating boundary BH can be obtained in the same way, and the similarities are not repeated here.

After the operating boundary BH is obtained, the method proceeds to step 23, the cursor calculation unit 124 calculates the cursor position 321 on the display 32 according to the control point position 33B, the operating boundary BH and the display boundary BD. In the above embodiment, it is exemplified that the display boundary BD is calculated before entering the practical operating stage. However, the embodiment is not limited to such exemplification, and the display boundary BD can be predetermined in the recognition circuit 11.

Figure 11:
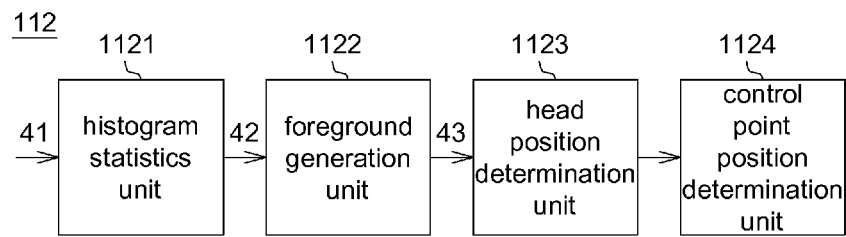
FIG. 11 shows a schematic diagram of a position recognition circuit.
Figure 12:
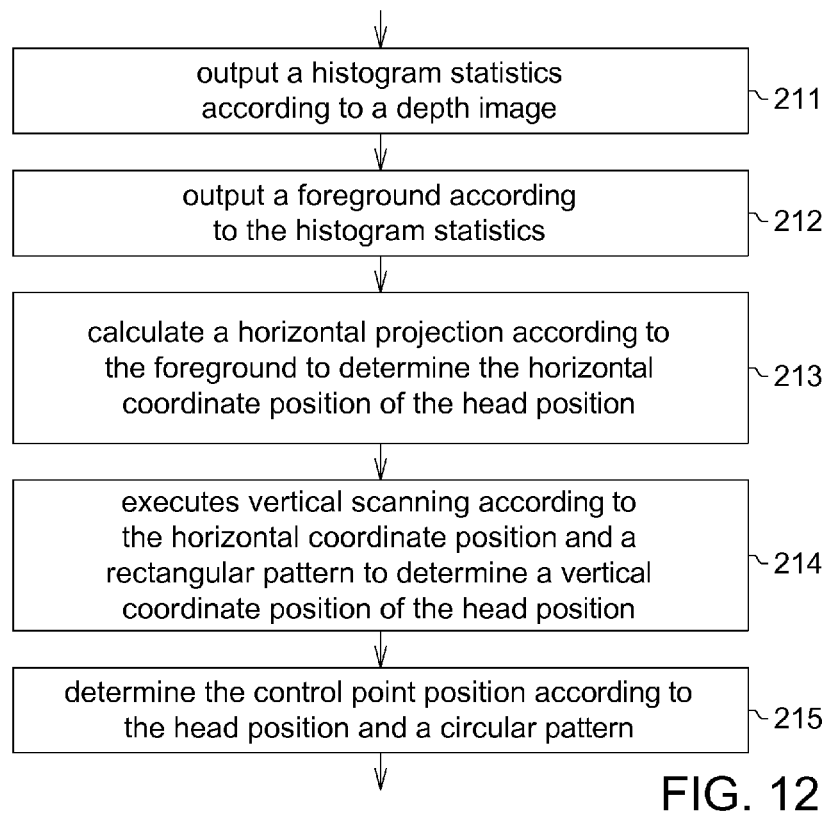
FIG. 12 shows a detailed flowchart of step 21.
Figure 13:
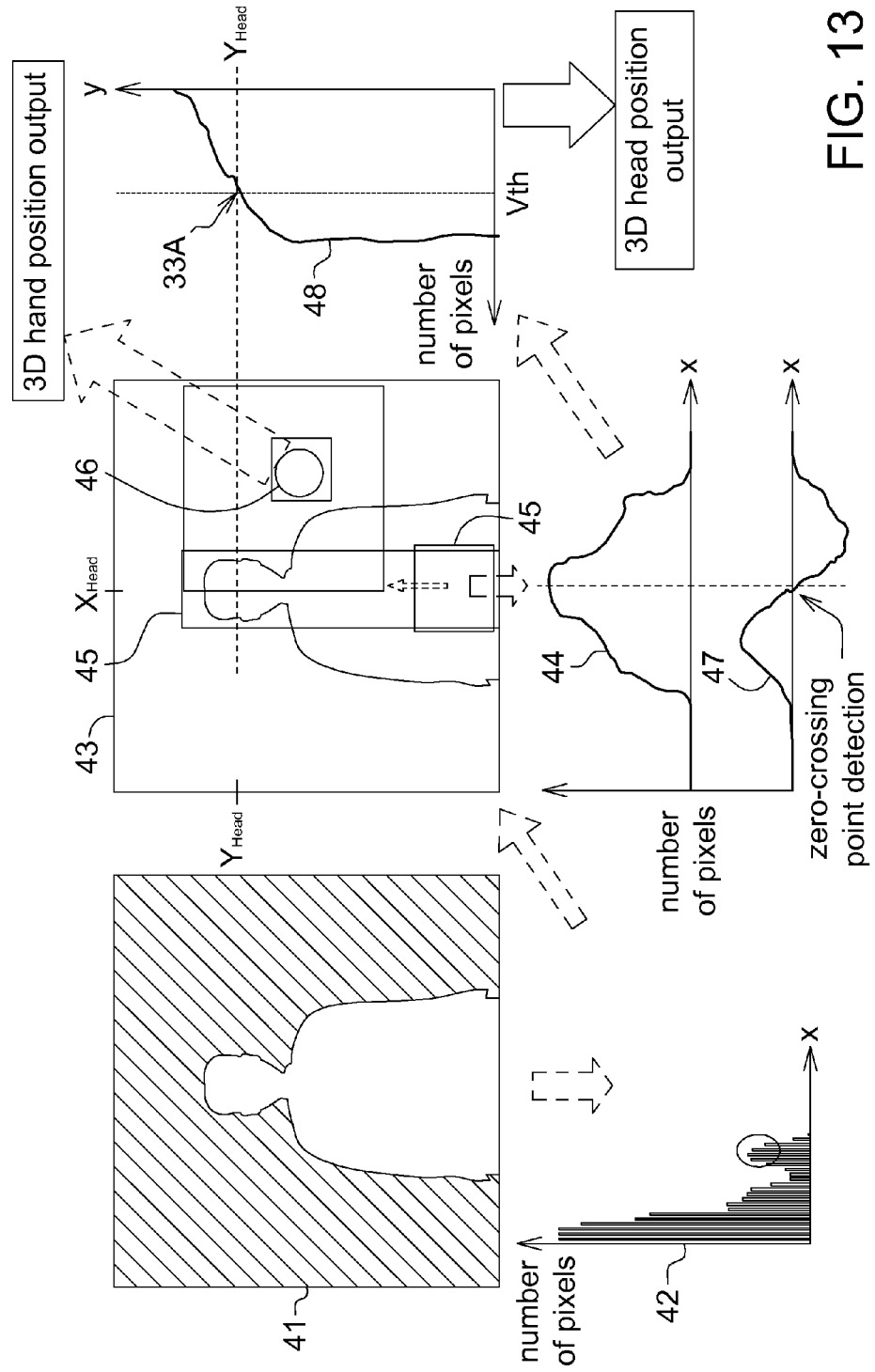
FIG. 13 shows a schematic diagram of position recognition.

Referring to FIG. 1, FIG. 3, FIG. 11, FIG. 12 and FIG. 13. FIG. 11 shows a schematic diagram of a position recognition circuit. FIG. 12 shows a detailed flowchart of step 21. FIG. 13 shows a schematic diagram of position recognition. The recognition circuit 11 further comprises an operator detection unit 111 and a position recognition circuit 112. The operator detection unit 111 detects the human body nearest to the image capturing apparatus 31 and assumes the human body as the operator 33. The position recognition circuit 112 recognizes the head position 33A and the control point position 33B of the operator 33.

The position recognition circuit 112 comprises a histogram statistics unit 1121, a foreground generation unit 1122, a head position determination unit 1123 and a control point position determination unit 1124, and step 21 further comprises step 211~215. As indicated in step 211, the histogram statistics unit 1121 outputs a histogram statistics 42 according to a depth image 41. A horizontal axis corresponding to the histogram statistics 42 represents the horizontal location of the depth image 41, and a vertical axis corresponding to the histogram statistics 42 represents the number of pixels of the depth image 41 in one horizontal location. As indicated in step 212, the foreground generation unit 1122 outputs a foreground 43 according to the histogram statistics 42. Furthermore, the foreground and the background form two peaks in the histogram statistics 42, and the foreground generation unit 1122 can directly use the depth distance between the peaks as a basis for separating the foreground from the background.

As indicated in step 213, the head position determination unit 1123 calculates a horizontal projection 44 according to the foreground 43 to determine the horizontal coordinate position $X_{Head}$ of the head position 33A. A horizontal axis corresponding to the horizontal projection 44 represents the horizontal location of the foreground 43, and a vertical axis corresponding to the horizontal projection 44 represents the number of pixels of the foreground 43 in one horizontal location. A vertical axis corresponding to the curve 48 represents the vertical location of the foreground 43, and a horizontal axis corresponding to the curve 48 represents the number of pixels of the foreground 43 in one vertical location. Furthermore, the head position determination unit 1123 executes zero-crossing point detection on a first order derivative 47 of the horizontal projection 44 to determine a horizontal coordinate position $X_{Head}$.

As indicated in step 214, the head position determination unit 1123 executes vertical scanning according to the horizontal coordinate position $X_{Head}$ and a rectangular pattern 45 to determine a vertical coordinate position $Y_{Head}$ of the head position 33A. Furthermore, if the number of pixels within the rectangular pattern 45 is smaller than a predetermined threshold Vth, then the head position determination unit 1123 determines the vertical coordinate position $Y_{Head}$ according to the location of the rectangular pattern 45.

As indicated in step 215, the control point position determination unit 1124 determines the control point position 33B according to the head position 33A and a circular pattern 46. Since the silhouette of the palm is nearly circular, the control point position determination unit 1124 uses the circular pattern 46 for comparison when detecting the control point position 33B. When the operator 33 is more than 2 meters away from the image capturing apparatus 31, the palm and other parts of the arm may have similar or the same depth value due to insufficient resolution of depth. Meanwhile, if the determination of the control point position 33B is solely based on depth information (such as the depth nearest to the image capturing apparatus 31), error may occur and the control point position 33B may be erroneous or jumping. To avoid the erroneous determination caused by similar depth, the control point position determination unit 1124 uses the circular pattern 46 for comparison when detecting the control point position 33B so as to increase the accuracy.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A display control apparatus, comprising:
   a recognition circuit used for recognizing a head position and two control point positions of an operator in an initialization stage; and
   a mapping circuit coupled with the recognition circuit and used for dynamically adjusting an operating boundary according to the head position, the two control point positions and a display boundary, wherein a relationship of similar triangle is formed by the head position, the two control point positions and two corner points of the display boundary corresponding to the two control point positions, and calculating a cursor position on a display according to a new control point position in a practical operating stage, the operating boundary and the display boundary, wherein the cursor position remains on an imaginary line passing through the head position and the new control point position.

2. The display control apparatus according to claim 1, wherein the mapping circuit further comprises:
   a stage determination unit used for determining whether the display control apparatus enters the initialization stage;
   an initialization unit used for determining the display boundary according to the head position and the two control point positions when the display control apparatus enters the initialization stage, wherein each of the two control point positions needs to remain on an imaginary line passing through the head position and each of the two corner points of the display.

3. The display control apparatus according to claim 1, wherein the mapping circuit further comprises:
   an operating boundary adjustment unit used for dynamically adjusting the operating boundary according to the head position, the two control point positions, and the display boundary defined by the relationship of similar triangle when the display control apparatus enters the practical operating stage; and
   a cursor calculation unit used for calculating the cursor position on the display according to the new control point position, the operating boundary and the display boundary.

4. The display control apparatus according to claim 1, wherein the display boundary is predetermined in the recognition circuit.

5. The display control apparatus according to claim 1, wherein the recognition circuit comprises:
   an operator detection unit used for detecting the human body nearest to an image capturing apparatus and assuming the detected human body as the operator; and
   a position recognition circuit used for recognizing the head position and the control point position of the operator.

6. The display control apparatus according to claim 5, wherein the position recognition circuit recognizes the head position and the two control point positions according to a depth image.

7. The display control apparatus according to claim 6, wherein the position recognition circuit further comprises:
   a histogram statistics unit used for outputting a histogram statistics according to the depth image;
   a foreground generation unit used for outputting a foreground according to the histogram statistics;
   a head position determination unit used for calculating a horizontal projection according to the foreground to determine a horizontal coordinate position of the head position, and executing a vertical scanning according to the horizontal coordinate position and a rectangular pattern to determine a vertical coordinate position of the head position; and
   a control point position determination unit used for determining the two control point positions according to the head position and a circular pattern.

8. The display control apparatus according to claim 7, wherein the head position determination unit executes zero-crossing point detection on a first order derivative of the horizontal projection to determine the horizontal coordinate position.

9. The display control apparatus according to claim 7, wherein when the number of pixels within the rectangular pattern is smaller than a predetermined threshold, the head position determination unit determines the vertical coordinate position according to the location of the rectangular pattern.

10. A display control method, comprising:
recognizing a head position and two control point positions of an operator in an initialization stage;
dynamically adjusting an operating boundary according to the head position, the two control point positions and a display boundary, wherein a relationship of similar triangle is formed by the head position, the two control point positions and two corner points of the display boundary corresponding to the two control point positions; and
calculating a cursor position on a display according to a new control point position in a practical operating stage, the operating boundary and the display boundary, wherein the cursor position remains on an imaginary line passing through the head position and the new control point position.

11. The display control method according to claim 10, further comprising:
determining whether to enter the initialization stage; and
determining the display boundary according to the head position and the two control point positions after entering the initialization stage, wherein each of the two control point positions needs to remain on an imaginary line passing through the head position and each of the two corner points of the display.

12. The display control method according to claim 10, wherein the display boundary is predetermined.

13. The display control method according to claim 10, wherein in the recognition step, the head position and the two control point positions are recognized according to a depth image.

14. The display control method according to claim 13, wherein the recognition step comprises:
outputting a histogram statistics according to the depth image;
outputting a foreground according to the histogram statistics;
calculating a horizontal projection according to the foreground to determine a horizontal coordinate position of the head position;
executing a vertical scanning according to the horizontal coordinate position and a rectangular pattern to determine a vertical coordinate position of the head position; and
determining the control point position according to the head position and a circular pattern.

15. The display control method according to claim 14, wherein in the recognition step, zero-crossing point detection is executed on a first order derivative of the horizontal projection to determine the horizontal coordinate position.

16. The display control method according to claim 14, wherein the vertical coordinate position determination step comprises:
determining whether the number of pixels within the rectangular pattern is smaller than a predetermined threshold; and
determining the vertical coordinate position according to the location of the rectangular pattern when the number of pixels within the rectangular pattern is smaller than the predetermined threshold.

17. The display control method according to claim 10, further comprising:
detecting the human body nearest to an image capturing apparatus and assuming the detected human body as the operator.

18. The display control method according to claim 10, wherein in the operating boundary adjustment step, the operating boundary is dynamically adjusted according to the head position, the two control point positions, and the display boundary defined by the relationship of similar triangle.

19. A display control apparatus, comprising:
a recognition circuit used for recognizing a head position and a control point position of an operator; and
a mapping circuit coupled with the recognition circuit and used for dynamically adjusting an operating boundary according to the head position, the control point position and a display boundary, and calculating a cursor position on a display according to the control point position, the operating boundary and the display boundary, wherein the cursor position remains on an imaginary line passing through the head position and the control point position,
wherein the mapping circuit comprises:
a stage determination unit used for determining whether the display control apparatus enters an initialization stage; and
an initialization unit used for determining the display boundary according to the head position and the control point position when the display control apparatus enters the initialization stage, wherein the control point position needs to remain on an imaginary line passing through the head position and the display corner.

20. A display control method, comprising:
recognizing a head position and a control point position of an operator;
dynamically adjusting an operating boundary according to the head position, the control point position and a display boundary; and
calculating a cursor position on a display according to the control point position, the operating boundary and the display boundary, wherein the cursor position remains on an imaginary passing through the head position and the control point position;
determining whether to enter an initialization stage; and
determining the display boundary according to the head position and the control point position after entering an initialization stage, wherein the control point position needs to remain on an imaginary line passing through the head position and the display corner.

* * * * *